(12) United States Patent  (10) Patent No.: US 8,820,906 B2
Miura et al.  (45) Date of Patent: Sep. 2, 2014

(54) INK COMPOSITION AND RECORDING METHOD

(75) Inventors: Satoru Miura, Matsumoto (JP); Taketoshi Kagose, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 266 days.

(21) Appl. No.: 13/049,415

(22) Filed: Mar. 16, 2011

(65) Prior Publication Data

US 2011/0229647 A1 Sep. 22, 2011

(30) Foreign Application Priority Data

Mar. 16, 2010 (JP) .................................. 2010-058885

(51) Int. Cl.
*B41J 2/01* (2006.01)

(52) U.S. Cl.
USPC .............................. 347/100; 347/95; 347/101

(58) Field of Classification Search
USPC ......... 347/100, 95, 96, 101, 102, 88, 99, 103, 347/105, 21, 22, 9, 20; 106/31.6, 31.27, 106/31.13; 523/160, 161
See application file for complete search history.

(56) References Cited

U.S. PATENT DOCUMENTS

| | | | |
|---|---|---|---|
| 3,567,453 A | 3/1971 | Borden | |
| 4,343,891 A | 8/1982 | Aasen et al. | |
| 4,590,287 A | 5/1986 | Riediker et al. | |
| 4,713,401 A | 12/1987 | Riediker et al. | |
| 4,743,528 A | 5/1988 | Farid et al. | |
| 4,743,529 A | 5/1988 | Farid et al. | |
| 4,743,530 A | 5/1988 | Farid et al. | |
| 4,743,531 A | 5/1988 | Farid et al. | |
| 4,855,468 A | 8/1989 | Riediker et al. | |
| 4,857,654 A | 8/1989 | Riediker et al. | |
| 4,910,121 A | 3/1990 | Riediker et al. | |
| 4,962,012 A | 10/1990 | Riediker et al. | |
| 4,970,136 A | 11/1990 | Riediker et al. | |
| 4,987,056 A | 1/1991 | Imahashi et al. | |
| 5,026,625 A | 6/1991 | Riediker et al. | |
| 5,034,307 A | 7/1991 | Riediker et al. | |
| 7,344,236 B2 | 3/2008 | Morimoto | |
| 2003/0222962 A1* | 12/2003 | Hirai | 347/102 |
| 2005/0250869 A1* | 11/2005 | Claes et al. | 522/71 |
| 2006/0050121 A1* | 3/2006 | Takabayashi et al. | 347/100 |
| 2006/0189712 A1* | 8/2006 | Kondo | 523/160 |

(Continued)

FOREIGN PATENT DOCUMENTS

| | | |
|---|---|---|
| CN | 1593917 A | 3/2005 |
| CN | 1919942 A | 2/2007 |

(Continued)

*Primary Examiner* — Manish S Shah
(74) *Attorney, Agent, or Firm* — Nutter McClennen & Fish LLP; John J. Penny, Jr.; Taylor M. Coon

(57) ABSTRACT

An ink composition has a viscosity of 25 mPa·s to 35 mPa·s at 20° C., wherein a, b, and c are 800 or more, 7.4 to 14, and 0.16 to 0.22, respectively, when a cylindrical portion is formed by expanding the ink composition so as to have a free surface parallel to the expanding direction of the ink composition, the rate of change in width of the cylindrical portion with time is measured in the expanding direction thereof, and the rate of change in width of the cylindrical portion with time is fit to a quadratic function given by the following equation:

$$S = -at^2 - bt + c \qquad (1)$$

where S is the rate of change in width of the cylindrical portion and t is the time in seconds.

10 Claims, 2 Drawing Sheets

(56) References Cited

U.S. PATENT DOCUMENTS

| | | | |
|---|---|---|---|
| 2007/0049651 A1 | 3/2007 | Watanabe | |
| 2008/0075883 A1 | 3/2008 | Hayata et al. | |
| 2008/0182030 A1* | 7/2008 | Oyanagi et al. | 427/511 |
| 2008/0226833 A1* | 9/2008 | Kiefer-Liptak | 427/514 |
| 2010/0285282 A1* | 11/2010 | Selman et al. | 347/100 |
| 2011/0015294 A1 | 1/2011 | Kito et al. | |

FOREIGN PATENT DOCUMENTS

| | | |
|---|---|---|
| EP | 109772 A2 | 5/1984 |
| EP | 109773 A2 | 5/1984 |
| EP | 0334338 A2 | 9/1989 |
| EP | 1829941 A1 | 5/2007 |
| JP | 1-152109 A | 5/1975 |
| JP | 59-152396 A | 8/1984 |
| JP | 61-151197 A | 7/1986 |
| JP | 63-41484 A | 2/1988 |
| JP | 63-138345 A | 6/1988 |
| JP | 63-142345 A | 6/1988 |
| JP | 63-142346 A | 6/1988 |
| JP | 63-143537 A | 6/1988 |
| JP | 1-304453 A | 12/1989 |
| JP | 2249 A | 1/1990 |
| JP | 24705 A | 1/1990 |
| JP | 2003-341217 A | 12/2003 |
| JP | 2006-299212 A | 11/2006 |
| JP | 2007-169543 A | 7/2007 |
| JP | 2008-179076 A | 8/2008 |
| JP | 2009-275175 A | 11/2009 |
| JP | 2009-285854 A | 12/2009 |
| JP | 2010-047636 A | 3/2010 |

* cited by examiner

INK COMPOSITION AND RECORDING METHOD

BACKGROUND

1. Technical Field

The present invention relates to an ink composition and a recording method.

2. Related Art

In recent years, techniques for forming images using photocurable ink compositions curable with light such as ultraviolet light have been widely used for printing by ink jet recording. The use of such photocurable ink compositions allows images having high color developability and weather resistance to be formed on, for example, recording media having low ink absorbency.

A photocurable ink composition usually contains a colorant, a polyfunctional monomer, and an ultraviolet polymerization initiator at least and is designed to exhibit desired performance by controlling the type, content, and/or combination of these compounds.

Methods for ejecting ink compositions from ink jet recording heads to apply the ink compositions to recording media need to be capable of forming fine images. Therefore, for example, attempts have been made to increase the density of nozzles for ejecting ink and to reduce the volume of droplets of ejected ink compositions as disclosed in JP-A-2008-179076.

Photocurable ink compositions contain high-viscosity compounds or high-molecular weight compounds, such as polymers or oligomers, for increasing the performance of the photocurable ink compositions in some cases. When the photocurable ink compositions contain such compounds, heads for ejecting the photocurable ink compositions need to have increased discharge capacity.

In the development of such ink compositions, the type and/or amount of components contained in the ink compositions is limited depending on, for example, head capacity. Even if heads have a discharge capacity sufficiently large with respect to the type and amount of desired components, the heads fail to form ink droplets in some cases. For example, when an ink composition is ejected from nozzles, droplets of the ink composition are unlikely to fly separately or fine droplets (satellites) other than desired droplets are formed in some cases. This leads to a reduction in quality of an image to be recorded.

The inventors have made investigations on the basis of the idea that a cause of such a failure is the dynamic change in shape of an ink composition near a nozzle. As a result, the inventors have found that droplets of the ink composition can be stably ejected from the nozzle so as to have a uniform shape as designed in such a manner that the expansibility of the ink composition is controlled within a specific range.

SUMMARY

An advantage of some aspects of the invention is to provide an ink composition having expansibility controlled within a specific range.

The invention can be accomplished in embodiments or applications below.

(Application 1)

An ink composition according to an embodiment of the invention has a viscosity of 25 mPa·s to 35 mPa·s at 20° C., wherein a, b, and c are 800 or more, 7.4 to 14, and 0.16 to 0.22, respectively, when a cylindrical portion is formed by expanding the ink composition so as to have a free surface parallel to the expanding direction of the ink composition, the rate of change in width of the cylindrical portion with time is measured in the expanding direction thereof, and the rate of change in width of the cylindrical portion with time is fit to a quadratic function given by the following equation:

$$S = -at^2 - bt + c \tag{1}$$

where S is the rate of change in width of the cylindrical portion and t is the time in seconds.

The ink composition can be stably ejected from an ink-ejecting head of an ink jet recording apparatus. Thus, a high-quality image in which print positions are hardly displaced or which is less affected by satellites can be provided.

(Application 2)

In Application 1, the rate of change S may be based on the width of the cylindrical portion at the beginning of expansion.

The ink composition can be stably ejected from an ink-ejecting head of an ink jet recording apparatus.

(Application 3)

In Application 1 or 2, the time taken to reduce the width of the cylindrical portion to zero may be within 0.1 second from the beginning of expansion.

The ink composition can be quickly separated into droplets after being ejected.

(Application 4)

In any one of Applications 1 to 3, the ink composition may contain at least one polymerizable compound and at least one photopolymerization initiator.

The ink composition is a type of photocurable ink composition and can provide a high-quality image in which print positions are hardly displaced or which is less affected by satellites.

(Application 5)

A recording method according to an embodiment of the invention includes ejecting the ink composition according to any one of Applications 1 to 4 from an ink jet recording head such that the ink composition is applied to a recording medium.

The recording method uses the ink composition, which can be stably ejected from an ink jet recording head; hence, a high-quality image in which print positions are hardly displaced or which is less affected by satellites can be quickly formed on a recording medium by the recording method.

(Application 6)

In Application 5, the driving frequency F of the ink jet recording head may be 1 kHz to 200 kHz.

Since the driving frequency F of the ink jet recording head is 1 kHz to 200 kHz, a high-density image can be quickly formed on a recording medium by the recording method.

(Application 7)

In Application 5 or 6, the ink jet recording head includes a nozzle for ejecting the ink composition and the nozzle has a diameter of 1 μm to 50 μm.

According to the recording method, a higher-density image can be quickly formed on a recording medium.

(Application 8)

In any one of Applications 5 to 7, droplets of the ink composition applied to the recording medium may each have a volume of 0.1 pl to 20 pl.

According to the recording method, a higher-density image can be quickly formed on a recording medium.

(Application 9)

In any one of Applications 5 to 8, the ink jet recording head includes a multilayer piezoelectric element and is operated in a longitudinal mode.

According to the recording method, a high-quality image in which print positions are hardly displaced or which is less affected by satellites can be formed on a recording medium.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1C:
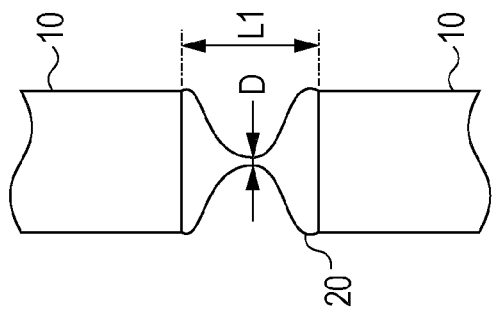
FIGS. 1A to 1C are illustrations showing an ink composition being expanded.

Embodiments of the invention will now be described. The embodiments are for illustrative purposes only. The invention is not limited to the embodiments and includes various modifications made within the scope of the invention. All configurations described in the embodiments are not necessarily essential elements of the invention.

1. Ink Composition 1.1. Properties of Ink Composition

An ink composition according to an embodiment of the invention has a viscosity of 25 mPa·s to 35 mPa·s at 20° C. The ink composition preferably has a viscosity of 10 mPa·s to 15 mPa·s at 40° C. The viscosity of the ink composition is controlled on the basis of the content, molecular weight, molecular structure, and molecular interaction of each component contained in the ink composition. When the viscosity of the ink composition is within the above range at 20° C., the viscosity thereof can be reduced to below the above range by heating the ink composition to higher than 20° C. The viscosity of the ink composition can be readily adjusted to, for example, 10 mPa·s to 15 mPa·s at 40° C. Therefore, the ink composition can be well ejected from an ink jet recording head by, for example, heating the ink jet recording head. The ink composition can be well ejected from the ink jet recording head by heating the ink composition to higher than 20° C. because the viscosity of the ink composition is less than the viscosity at 20° C. The temperature at which the ink composition is ejected from the ink jet recording head is not limited to 40° C., which is used as a guide. If the ink composition can be ejected, the temperature of the ink composition may be 20° C. or lower. When the viscosity of the ink composition is outside the range of 25 mPa·s to 35 mPa·s at 20° C., it may be difficult to eject the ink composition with, for example, an ink jet recording apparatus. The viscosity of the ink composition can be measured by an ordinary method.

The ink composition is characterized in such a manner that a cylindrical portion is formed by expanding the ink composition so as to have a free surface parallel to the expanding direction of the ink composition and the rate of change in width of the cylindrical portion with time is measured in the expanding direction thereof. The ink composition is controlled such that a, b, and c are 800 or more, 7.4 to 14, and 0.16 to 0.22, respectively, when the rate of change in width of the cylindrical portion with time is fit to a quadratic function given by the following equation:

$$S = -at^2 - bt + c \qquad (1)$$

where S is the rate of change in width of the cylindrical portion and t is the time in seconds.

The term "expanding the ink composition" as used herein means that a tensile displacement is applied to a droplet of the ink composition. The term "cylindrical portion" as used herein refers to a continuous portion of the ink composition that is formed between two clots when the ink composition is being separated into the two clots by expanding the ink composition. The term "free surface" as used herein refers to a surface which is out of contact with any solid and of which the shape is principally determined by the action of surface tension. The continuous portion of the ink composition that is formed between the two clots formed by expanding the ink composition corresponds to the free surface and therefore has a cylindrical shape or a waisted cylindrical shape (such a shape that a center portion of a cylinder is narrow than other portions).

The width of the cylindrical portion is herein defined as the size of the cylindrical portion in the direction perpendicular to the expanding direction of the cylindrical portion and corresponds to the width of the narrowest part of the cylindrical portion when the cylindrical portion is waisted. The cylindrical portion, which corresponds to the free surface as described above, has a cross section which is perpendicular to the expanding direction of the cylindrical portion and which is very close to a circular shape. Therefore, when viewed in the direction perpendicular to the expanding direction of the cylindrical portion, the width of the cylindrical portion can be measured in any direction. The unit of the time t in Equation (1) is "second". The origin of the time t is set between the point in time when the ink composition begins to be expanded and the point in time when the ink composition is separated into the two clots.

The rate of change S in width is defined as the ratio of the width of the cylindrical portion at the moment of measurement to the width of the cylindrical portion at a specific point in time while the ink composition is being separated into the two clots. The rate of change S in width is expressed in, for example, percent. The width of the cylindrical portion is preferably 100 μm to 1 cm depending on a measuring method.

A method for measuring the width (the rate of change S) with time t can be exemplified as follows: for example, the width of the cylindrical portion is measured using a laser beam and a detector, placed opposite the laser beam with a sample disposed therebetween, for detecting the laser beam while the ink composition is being expanded. The method for measuring the width with time t is not limited to an optical method and may be an electrical method or a method using a high-speed camera or the like. As an example of an apparatus useful in measuring the width with time t, a commercially available extensional viscometer can be listed. The extensional viscometer is described in detail in examples below.

Fitting the rate of change S with time t to a quadratic function corresponds to the determination of a quadratic function most closely approximated by the method of least squares for the rate of change S and time t determined as described above. The determined quadratic function is given by the equation $S = -at^2 - bt + c$ and the values of a, b, and c are determined.

Upon fitting, the origin (0) of the time t is set to the point in time when the width of the cylindrical portion is reduced sufficiently to allow the width of the cylindrical portion to meet specific conditions, whereby the accuracy of fitting the quadratic function can be increased. This is because the width of the cylindrical portion becomes less than a specific value by expanding the ink composition and therefore a flow of the ink composition in the cylindrical portion becomes one-dimensional (an expansion fluid state).

As a result of fitting, the time ts (s) can be determined from the x-intercept (a width of 0) of the quadratic function. Therefore, for example, the time ts from when expanding is started or the flow of the ink composition in the cylindrical portion becomes one-dimensional (an expansion fluid state) to when the width is reduced to zero can be determined. The time is of the ink composition is preferably 0.1 s or less.

The ink composition is controlled on the basis of the content, molecular weight, molecular structure, and molecular interaction of each component contained in the ink composition and the zeta potential of particles of a colorant or the like, if contained, such that a, b, and c in Equation (1) are 800 or more, 7.4 to 14, and 0.16 to 0.22, respectively. When a, b, and c therein are outside the above ranges, for example, the rate at which the width of the cylindrical portion is reduced is insufficient. Hence, the rate at which the two clots of the ink composition are separated is likely to be small or third droplets (mists) are likely to be formed during separation.

Since the rate at which the width of the cylindrical portion of the ink composition is reduced is sufficiently small, the ink composition can be stably ejected from ink-ejecting heads of ink jet recording apparatuses. Thus, high-quality images in which print positions are hardly displaced or which are less affected by satellites can be provided.

1.2. Components of Ink Composition

Components of the ink composition are not particularly limited. The ink composition may contain, for example, polymerizable compound and a photopolymerization initiator at least.

1.2.1. Polymerizable Compound

The ink composition may contain the polymerizable compound. Examples of the polymerizable compound include cationically polymerizable compounds and radically polymerizable compounds. The polymerizable compound may contain a cationically polymerizable functional group and a radically polymerizable functional group. In this embodiment, the polymerizable compound characterized in that the polymerizable compound is polymerized and cured by at least one of cationic polymerization and radical polymerization. The polymerizable compound can be used in the form of a monomer, an oligomer, a linear polymer, or dendritic polymer.

The radically polymerizable functional group, which is contained in the polymerizable compound usable in the ink composition, may be a functional group having a double bond. Examples of the radically polymerizable functional group include a (meth)acrylic group; a (meth)acrylamide group; a vinyl group; aromatic vinyl groups; allyl groups; N-vinyl groups; vinyl ester groups such as groups having a vinyl acetate moiety, a vinyl propionate moiety, or a vinyl versatate moiety; allyl ester groups such as groups having an allyl acetate moiety; halogenated vinyl groups such as groups having a vinylidene chloride moiety or a vinyl chloride moiety; vinyl ether groups such as groups having a methyl vinyl ether moiety, a butyl vinyl ether moiety, a hexyl vinyl ether moiety, a methoxy vinyl ether moiety, a 2-ethylhexyl vinyl ether moiety, a methoxy ethyl vinyl ether moiety, a cyclohexyl vinyl ether moiety, or a chloroethyl vinyl ether moiety; vinyl cyanide groups such as groups having a (meth)acrylonitrile moiety); and alkenyl groups. The term "(meth)acrylate" as used herein refers to one or both of "acrylate" and "methacrylate". The term "(meth)acrylic" as used herein refers to one or both of "acrylic" and "methacrylic".

Among those exemplified above, a functional group having an ethylenically unsaturated double bond is highly polymerizable and therefore is more preferred in order to improve the curing rate and the curability of the ink composition deposited on a recording surface. Such a group is unlikely to be susceptible to oxygen inhibition and therefore is curable with relatively low energy, which is more preferred. Examples of the functional group having such an ethylenically unsaturated double bond include a vinyl group and allyl groups. The polymerizable compound preferably contains a plurality of radically polymerizable functional groups in view of reaction rate and curability.

Examples of the polymerizable compound include monofunctional (meth)acrylates; polyfunctional (meth)acrylates; (meth)acrylic amides; vinyl aromatics; aryl compounds; N-vinyl compounds; vinyl eaters such as vinyl acetate, vinyl propionate, and vinyl versatate; aryl esters such as aryl acetate; halogen-containing monomers such as vinylidene chloride and vinyl chloride; vinyl ethers such as methyl vinyl ether, butyl vinyl ether, hexyl vinyl ether, methoxy vinyl ether, 2-ethylhexyl vinyl ether, methoxyethyl vinyl ether, cyclohexyl vinyl ether, and chloroethyl vinyl ether; vinyl cyanate such as (meth)acrylonitrile; and olefins such as ethylene and propylene.

Examples of the monofunctional (meth)acrylates include hexyl (meth)acrylate, 2-ethylhexyl (meth)acrylate, tert-octyl (meth)acrylate, isoamyl (meth)acrylate, decyl (meth)acrylate, isodecyl (meth)acrylate, stearyl (meth)acrylate, isostearyl (meth)acrylate, cyclohexyl (meth)acrylate, 4-n-butylcyclohexyl (meth)acrylate, bornyl (meth)acrylate, isobornyl (meth)acrylate, benzyl (meth)acrylate, 2-ethylhexyl diglycol (meth)acrylate, butoxy (meth)acrylate, 2-chloroethyl (meth)acrylate, 4-bromobutyl (meth)acrylate, cyanoethyl (meth)acrylate, benzyl (meth)acrylate, butoxymethyl (meth)acrylate, 3-methoxybutyl (meth)acrylate, alkoxymethyl (meth)acrylate, alkoxyethyl (meth)acrylate, 2-(2-methoxyethoxy)ethyl (meth)acrylate, 2-(2-butoxyethoxy)ethyl (meth)acrylate, 2,2,2-trifluoroethyl (meth)acrylate, 1H,1H,2H,2H-perfluorodecyl (meth)acrylate, 4-butylphenyl (meth)acrylate, phenyl (meth)acrylate, 2,4,5-trimethylphenyl (meth)acrylate, 4-chlorophenyl (meth)acrylate, phenoxymethyl (meth)acrylate, phenoxyethyl (meth)acrylate, glycidyl (meth)acrylate, glycidyloxybutyl (meth)acrylate, glycidyloxyethyl (meth)acrylate, glycidyloxypropyl (meth)acrylate, tetrahydrofurfuryl (meth)acrylate, hydroxyalkyl (meth)acrylates, 2-hydroxyethyl (meth)acrylate, 3-hydroxypropyl (meth)acrylate, 2-hydroxypropyl (meth)acrylate, 2-hydroxybutyl (meth)acrylate, 4-hydroxybutyl (meth)acrylate, dimethylaminoethyl (meth)acrylate, diethylaminoethyl (meth)acrylate, dimethylaminopropyl (meth)acrylate, diethylaminopropyl (meth)acrylate, trimethoxysilylpropyl (meth)acrylate, dicyclopentenyl (meth)acrylate, dicyclopentenyloxy (meth)acrylate, trimethoxylsilylpropyl (meth)acrylate, trimethylsilylpropyl (meth)acrylate, polyethylene oxide monomethyl ether (meth)acrylate, oligoethylene oxide monomethyl ether (meth)acrylate, polyethylene oxide (meth)acrylate, oligoethylene oxide (meth)acrylate, oligoethylene oxide monoalkyl ether (meth)acrylates, polyethylene oxide monoalkyl ether (meth)acrylates, dipropylene glycol (meth)acrylate, polypropylene oxide monoalkyl ether (meth)acrylates, oligopropylene oxide monoalkyl ether (meth)acrylates, 2-methacryloyloxylsuccinic acid, 2-methacryloyloxy]hexahydrophthalic acid, 2-methacryloyloxyethyl-2-hydroxypropyl phthalate, butoxydiethylene glycol (meth)acrylate, trifluoroethyl (meth)acrylate, perfluorooctylethyl (meth)acrylate, 2-hydroxy-3-phenoxypropyl (meth)acrylate, EO-modified phenol (meth)acrylate, EO-modified cresol (meth)acrylate, EO-modified nonylphenol (meth)acrylate, PO-modified nonylphenol (meth)acrylate, and EO-modified 2-ethylhexyl (meth)acrylate.

Examples of the polyfunctional (meth)acrylates include bifunctional (meth)acrylates such as 1,6-hexanediol di(meth)acrylate, 1,10-decanediol di(meth)acrylate, neopentyl glycol di(meth)acrylate, dipropylene glycol di(meth)acrylate (DPGD(M)A), tripropylene glycol di(meth)acrylate (TPGD(M)A), 2,4-dimethyl-1,5-pentanediol di(meth)acrylate, butylethylpropanediol di(meth)acrylate, ethoxylated cyclohexane methanol di(meth)acrylate, triethylene glycol di(meth)acrylate (TEGD(M)A), polyethylene glycol di(meth)acrylate, oligoethylene glycol di(meth)acrylate, ethylene glycol di(meth)acrylate, 2-ethyl-2-butyl-butanediol di(meth)acrylate, neopentyl hydroxypivalate glycol di(meth)acrylate, dimethylol tricyclodecane di(meth)acrylate, EO-modified bisphenol-A di(meth)acrylate, bisphenol-F polyethoxy di(meth)acrylate, polypropylene glycol di(meth)acrylate, oligopropylene glycol di(meth)acrylate, 1,4-butanediol di(meth)acrylate, 2-ethyl-2-butylpropanediol di(meth)acrylate, 1,9-nonanediol di(meth)acrylate, propoxylated ethoxylated bisphenol-A di(meth)acrylate, and tricyclodecane di(meth)acrylate.

Other examples of the polyfunctional (meth)acrylates include trifunctional (meth)acrylates such as trimethylolpropane tri(meth)acrylate, trimethylolethane tri(meth)acrylate, alkyleneoxide-modified tri(meth)acrylate of trimethylolpropane, pentaerithrytol tri(meth)acrylate, dipentaerithrytol tri(meth)acrylate, trimethylolpropane tri(meth)acryloyloxypropyl)ether, isocyanuric alkyleneoxide-modified tri(meth)acrylate, dipentaerithrytol propionate tri(meth)acrylate, tri((meth)acryloyloxyethyl) isocyanulate, hydroxypivalaldehyde-modified dimethylolpropane tri(meth)acrylate, sorbitol tri(meth)acrylate, propoxylated trimethylolpropane tri(meth)acrylate, and ethoxylated glycerin triacrylate; tetrafunctional (meth)acrylates such as pentaerithrytol tetra(meth)acrylate, sorbitol tetra(meth)acrylate, ditrimethylolpropane tetra(meth)acrylate, dipentaerithrytol propionate tetra(meth)acrylate, and ethoxylated pentaerithrytol tetra(meth)acrylate; pentafunctional (meth)acrylates such as sorbitol penta(meth)acrylate and dipentaerithrytol penta(meth)acrylate; and hexafunctional (meth)acrylates such as dipentaerithrytol hexa(meth)acrylate, sorbitol hexa(meth)acrylate, alkylene oxide-modified hexa(meth)acrylates of phosphazenes, and captolactone-modified dipentaerithrytol hexa(meth)acrylate.

Other examples of the polyfunctional (meth)acrylates include compounds containing a plurality of (meth)acryloyl groups, that is, linear polymers each containing a plurality of (meth)acryloyl groups and dendritic polymers each containing a plurality of (meth)acryloyl groups. An example of the dendritic polymers containing such (meth)acryloyl groups is a compound, Biscoat #1000, available from Osaka Organic Chemical Industry Ltd. This compound is a hyper branched polymer, synthesized from pentaerithrytol, having branched groups. This compound contains acryloyl groups densely arranged at the surface of its molecule and therefore can be successfully used as the polymerizable compound.

Examples of the (meth)acrylic amides include (meth)acrylamide, N-methyl (meth)acrylamide, N-ethyl (meth)acrylamide, N-propyl (meth)acrylamide, N-n-butyl (meth)acrylamide, N-t-butyl (meth)acrylamide, N-butoxymethyl (meth)acrylamide, N-isopropyl (meth)acrylamide, N-methylol (meth)acrylamide, N,N-dimethyl (meth)acrylamide, N,N-diethyl (meth)acrylamide, and (meth)acryloyl morpholine.

Examples of the vinyl aromatics include styrene, methylstyrene, trimethystyrene, ethylstyrene, isopropylstyrene, chloromethyl styrene, methoxystyrene, acetoxystyrene, chlorostyrene, dichlorostyrene, bromostyrene, methyl vinylbenzoate, 3-methylstyrene, 4-methylstyrene, 3-ethylstyrene, 4-ethylstyrene, 3-propylstyrene, 4-propylstyrene, 3-butylstyrene, 4-butylstyrene, 3-hexylstyrene, 4-hexylstyrene, 3-octylstyrene, 4-octylstyrene, 3-(2-ethylhexyl)styrene, 4-(2-ethylhexyl)styrene, allylstyrene, isopropenylstyrene, butenylstyrene, octenylstyrene, 4-t-butoxycarbonylstyrene, 4-methoxystyrene, and 4-t-butoxystyrene.

The aryl compounds contain a 2-propenyl (—CH$_2$CH=CH$_2$) group. The 2-propenyl is also referred to as an allyl group, which is a trivial name according to the IUPAC nomenclature system. Examples of the aryl compounds include ethylene glycol monoallyl ether, diethylene glycol monoallyl ether, allyl glycol, trimethylol propane diallyl ether, trimethylol propane monoallyl ether, pentaerythritol triallyl ether, allyl glycidyl ether, glycerin monoallyl ether, hydroxybutyl vinyl ether, and allyl group-containing polyoxyalkylene compounds available under a trade name of UNIOX, UNILUBE, POLYCERIN, or UNISAFE from NOF Corporation.

The N-vinyl compounds have a structure (>N—CH=CH$_2$) in which a vinyl group is bonded to nitrogen. The N-vinyl compounds are radically polymerizable. Examples of the N-vinyl compounds include N-vinylformamide, N-vinylcarbazole, N-vinylindole, N-vinylpyrrole, N-vinylacetamide, N-vinylpyrrolidone, N-vinylcaprolactam, and derivatives thereof. In particular, N-vinylformamide is preferred. N-vinylformamide is available from, for example, Arakawa Kagaku Kogyo Co., Ltd.

Examples of the cationically polymerizable functional group, which is contained in the polymerizable compound usable in the ink composition, include functional groups having an epoxy ring such as an aromatic epoxy group or an alicyclic epoxy group, functional groups having an oxetane ring, functional groups having an oxolane ring, functional groups having a dioxolane ring, and functional groups having a vinyl ether moiety. The aromatic and alicyclic epoxy groups are preferred because these groups have excellent curing rates. In particular, the alicyclic epoxy group is preferred. The polymerizable compound preferably contains a plurality of cationically polymerizable functional groups in view of reaction rate and curability.

Examples of the cationically polymerizable compounds include epoxy compounds, vinyl ether compounds, and oxetane compounds. Specific Examples of the cationically polymerizable compounds include oxetane acrylate, oxetane methacrylate, 1,3-dioxolane (meth)acrylate, and (meth)acryl-modified epoxy compounds. Compounds having oxetane rings are described in paragraphs [0021] to [0084] of JP-A-2003-341217 in detail and can be used herein.

The content of the polymerizable compound in the ink composition is preferably 5% to 95%, more preferably 7% to 90%, and further more preferably 10% to 80% on a mass basis.

1.2.2. Photopolymerization Initiator

The ink composition may contain the photopolymerization initiator as described above. The photopolymerization initiator can produce active species for the polymerization of the polymerizable compound when the photopolymerization initiator absorbs light.

Any photopolymerization initiators, capable of producing photoradicals, known to those skilled in the art can be used herein without limitation. Examples of the photopolymerization initiator include various initiators described in Bruce M. Monroe et al., *Chemical Review,* 93, 435 (1993); R. S. Davidson, *Journal of Photochemistry and biology A: Chemistry,* 73, 81 (1993); J. P. Faussier, *"Photoinitiated Polymerization-Theory and Applications"*: Rapra Review vol. 9, Report, Rapra Technology (1998); and M. Tsunooka et al., *Prog.*

*Polym. Sci.,* 21, 1 (1996). Other examples of the photopolymerization initiator include various compounds used for chemically-amplified photoresists or photocationic polymerization as described in The Japanese Research Association for Organic Electronics Materials, *Organic Materials for Imaging,* pp. 187-192, 1993, Bun-Shin Publishing. Other examples of the photopolymerization initiator include compounds undergoing oxidative or reductive bond cleavage through the interaction with a sensitizing dye in an electronically excited state as described in F. D. Saeva, *Topics in Current Chemistry,* 156, 59 (1990); G. G. Maslak, *Topics in Current Chemistry,* 168, 1 (1993); H. B. Shuster et al., *JACS,* 112, 6329 (1990); and I. D. F. Eaton et al., *JACS,* 102, 3298 (1980).

Preferred examples of the photopolymerization initiator include (a) aromatic ketones, (b) aromatic onium salts, (c) organic peroxides, (d) hexaarylbiimidazole compounds, (e) ketoxime esters, (f) borates, (g) azinium compounds, (h) metallocene compounds, (i) active esters, (j) carbon-halogen bond-containing compounds, and (k) acylphosphine oxides.

(a) Preferred examples of the aromatic ketones include α-thiobenzophenone compounds, benzoin ethers, α-substituted benzoin compounds, benzoin derivatives, aroylphosphonates, dialkoxybenzophenones, benzoin ethers, α-aminobenzophenones, p-di(dimethylaminobenzoyl)benzene, thio-substituted aromatic ketones, acylphosphine sulfide, acylphosphine, thioxanthones, and coumarins.

(b) Examples of the aromatic onium salts include aromatic onium salts of elements of the V, VI and VII groups of the periodic table, that is, aromatic onium salts of N, P, As, Sb, Bi, O, S, Se, Te, and I. Preferred examples of the aromatic onium salts include sulfonium salts, diazonium salts such as benzodiazoniums that may have substituents, diazonium salt resins such as diazodiphenylamine formaldehyde resins, and N-alkoxypyridinium salts such as 1-methoxy-4-phenylpyridinium tetrafluoroborate.

(c) Examples of the organic peroxides include most of organic compounds having one or more oxygen-oxygen bonds. Preferred examples of the organic peroxides include peroxide esters such as 3,3',4,4'-tetra-(t-butylperoxycarbonyl)benzophenone, 3,3',4,4'-tetra-(t-amylperoxycarbonyl)benzophenone, 3,3',4,4'-tetra-(t-hexylperoxycarbonyl)benzophenone, 3,3',4,4'-tetra-(t-octylperoxycarbonyl)benzophenone, 3,3',4,4'-tetra-(cumylperoxycarbonyl)benzophenone, 3,3',4,4'-tetra-(p-isopropylperoxycarbonyl)benzophenone, and di-t-butyldiperoxyisophthalate.

(d) Examples of the hexaarylbiimidazole compounds include 2,2'-bis(o-chlorophenyl)-4,4',5,5'-tetraphenylbiimidazole, 2,2'-bis(o-bromophenyl)-4,4',5,5'-tetraphenylbiimidazole, 2,2'-bis(o,p-dichlorophenyl)-4,4',5,5'-tetraphenylbiimidazole, 2,2'-bis(o-chlorophenyl)-4,4',5,5'-tetra(m-methoxyphenyl)biimidazole, 2,2'-bis(o,o'-dichlorophenyl)-4,4',5,5'-tetraphenylbiimidazole, 2,2'-bis(o-nitrophenyl)-4,4',5,5'-tetraphenylbiimidazole, 2,2'-bis(o-methylphenyl)-4,4',5,5'-tetraphenylbiimidazole, and 2,2'-bis(o-trifluorophenyl)-4,4',5,5'-tetraphenylbiimidazole.

(e) Examples of the ketoxime esters include 3-benzoyloxyiminobutane-2-one, 3-acetoxyiminobutane-2-one, 3-propionyloxyiminobutane-2-one, 2-acetoxyiminopentane-3-one, 2-acetoxyimino-1-phenylpropane-1-one, 2-benzoyloxyimino-1-phenylpropane-1-one, 3-p-toluene sulfonyloxyiminobutane-2-one, and 2-ethoxycarbonyloxyimino-1-phenylpropane-1-one.

(f) Examples of the borates, which are examples of the photopolymerization initiator used herein, include compounds described in U.S. Pat. Nos. 3,567,453 and 4,343,891 and European Patent Nos. 109,772 and 109,773.

(g) Examples of the azinium compounds, which are examples of the photopolymerization initiator used herein, include N—O bond-containing compounds disclosed in JP-A Nos. 63-138345, 63-142345, 63-142346, and 63-143537.

(h) Examples of the metallocene compounds, which are examples of the photopolymerization initiator used herein, include titanocene compounds disclosed in JP-A Nos. 59-152396, 61-151197, 63-41484, 2-249, and 2-4705 and iron-arene complexes disclosed in JP-A Nos. 1-304453 and 1-152109. Examples of the titanocene compounds include dicyclopentadienyl-Ti-dichloride, dicyclopentadienyl-Ti-bis-phenyl, dicyclopentadienyl-Ti-bis-2,3,4,5,6-pentafluorophenyl-1-yl, dicyclopentadienyl-Ti-bis-2,3,5,6-tetrafluorophenyl-1-yl, dicyclopentadienyl-Ti-bis-2,4,6-trifluorophenyl-1-yl, dicyclopentadienyl-Ti-bis-2,6-difluorophenyl-1-yl, dicyclopentadienyl-Ti-bis-2,4-difluorophenyl-1-yl, dimethylcyclopentadienyl-Ti-bis-2,3,4,5,6-pentafluorophenyl-1-yl, dimethylcyclopentadienyl-Ti-bis-2,3,5,6-tetrafluorophenyl-1-yl, bis(cyclopentadienyl)-bis (2,6-difluoro-3-(pyri-1-yl)phenyl)titanium, bis(cyclopentadienyl)bis[2,6-difluoro-3-(methylsulfoneamide) phenyl]titanium, and bis(cyclopentadienyl)bis[2,6-difluoro-3-(N-butylbiaroylamino)phenyl]titanium.

(i) Examples of the active esters include nitrobenzyl esters and iminosulfonates.

(j) Preferred examples of the carbon-halogen bond-containing compounds include compounds available under a trade name of Vicure 10 or Vicure 30 from Stauffer Chemical Co.; compounds available under a trade name of Irgacure 127, Irgacure 184, Irgacure 500, Irgacure 651, Irgacure 2959, Irgacure 907, Irgacure 369, Irgacure 379, Irgacure 754, Irgacure 1700, Irgacure 1800, Irgacure 1850, Irgacure 819, OXE 01, Darocure 1173, or ITX from Ciba Specialty Chemicals Inc.; a compound available under a trade name of Quantacure CTX from Aceto Chemical Co., Inc.; a compound available under a trade name of Kayacure DETX-S from Nippon Kayaku Co., Ltd.; and a compound available under a trade name of ESACURE KIP 150 from Lamberti.

(k) Preferred examples of the acylphosphine oxides include diphenyl(2,4,5-trimethylbenzoyl)phosphine oxide and a compound available under a trade name of Darocure TPO from Ciba Specialty Chemicals Inc.

When the ink composition contains the photopolymerization initiator, the content of the photopolymerization initiator in the ink composition is 1% to 20% and more preferably 3% to 15% on a mass basis. When the content thereof is within the above range, the curability of the ink composition can be ensured without reducing the mechanical strength of the cured ink composition. The photopolymerization initiator may be selected from those sensitive to light applied thereto.

1.2.3. Other Components 1.2.3.1. Colorant and Dispersant

The ink composition may contain a colorant and a dispersant.

Examples of the colorant include pigments and dyes. Any colorants for use in ordinary inks can be used herein without limitation.

Examples of a dye that may be contained in the ink composition include various dyes, such as direct dyes, acid dyes, food dyes, basic dyes, reactive dyes, dispersed dyes, vat dyes, soluble vat dyes, and reactive dispersion dyes, usually used for ink jet recording.

Examples of a pigment that may be contained in the ink composition include inorganic pigments and organic pigments.

Examples of the inorganic pigments include titanium oxide, iron oxide, and carbon black produced by a known process such as a contact process, a furnace process, or a thermal process. Examples of the organic pigments include azo pigments such as azo lakes, insoluble azo pigments, condensed azo pigments, and chelate azo pigments; polycyclic pigments such as phthalocyanine pigments, perylene pigments, perinone pigments, anthraquinone pigments, quinacridone pigments, dioxazine pigments, thioindigo pigments, isoindolinone pigments, and quinophthalone pigments; dye chelates such as basic dye chelates and acid dye chelates; nitro pigments; nitroso pigments; and aniline black.

Examples of the pigments include black pigments, yellow pigments, magenta pigments, cyan pigments, and white pigments. Examples of the black pigments include C.I. Pigment Black 7; Carbon Black No. 2300, No. 900, MCF88, No. 33, No. 40, No. 45, No. 52, MA7, MA8, MA100, and No. 2200B available from Mitsubishi Kasei Corporation; Raven 5750, Raven 5250, Raven 5000, Raven 3500, Raven 1255, and Raven 700 available from Colombia; Regal 400R, Regal 330R, Regal 660R, Mogul L, Mogul 700, Monarch 800, Monarch 880, Monarch 900, Monarch 1000, Monarch 1100, Monarch 1300, and Monarch 1400 available from Cabot; and Color Black FW1, Color Black FW2, Color Black FW2V, Color Black FW18, Color Black FW200, Color Black 5150, Color Black 5160, Color Black 5170, Printex 35, Printex U, Printex V, Printex 140U, Special Black 6, Special Black 5, Special Black 4A, and Special Black 4 available from Degussa.

Examples of the yellow pigments include C.I. Pigment Yellow 1, 2, 3, 12, 13, 14, 16, 17, 73, 74, 75, 83, 93, 95, 97, 98, 109, 110, 114, 120, 128, 129, 138, 150, 151, 154, 155, 180, 185, and 213 and CHROMOPHTAL YELLOW LA2 available from Ciba Specialty Chemicals Inc.

Examples of the magenta pigments include C.I. Pigment Red 5, 7, 12, 48(Ca), 48(Mn), 57(Ca), 57:1, 112, 122, 123, 168, 184, 202, 209, C.I. Pigment Violet 19, and Hostaperm Pink E02 available from Clariant (Japan) K.K.

Examples of the cyan pigments include C.I. Pigment Blue 1, 2, 3, 15:3, 15:4, 60, 16, 22, and TGR-SD available from DIC Corporation.

Examples of the white pigments include C.I. Pigment White 6.

The ink composition may contain a plurality of colorants. The ink composition may contain, for example, four basic color colorants: a yellow colorant, a magenta colorant, a cyan colorant, and a black colorant. The ink composition may further contain colorants each having a color darker or lighter than that of a corresponding one of the four basic color colorants. That is, the ink composition may further contain a light magenta colorant, a red colorant, a light cyan colorant, a blue colorant, a gray colorant, and a matte black colorant in addition to the four basic color colorants.

When the ink composition contains a pigment, the pigment preferably has an average particle size of about 10 nm to 200 nm and more preferably about 50 nm to 150 nm. When the ink composition contains a colorant, the content of the colorant in the ink composition is preferably about 0.1% to 25% and more preferably about 0.5% to 15% on a mass basis.

When the ink composition contains the pigment, a pigment dispersion prepared by dispersing the pigment in a medium with a dispersant or a surfactant can be used to produce the ink composition. When the ink composition contains the pigment, the dispersant or the surfactant may be contained in the ink composition in addition to the pigment. A preferred example of the dispersant may be, for example, a polymeric dispersant usually used to prepare pigment dispersions.

The dispersant may be any one for use in ordinary ink. The dispersant is preferably one that acts effectively when an organic solvent used has a solubility parameter of 8 to 11. Commercially available examples of the dispersant include polyester compounds, such as Hinoacto KF1-M, T-6000, T-7000, T-8000, T-8350P, and T-8000 EL, available from Takefu Fine Chemicals Co., Ltd.; dispersants, such as Solsperse 13940, 20000, 24000, 32000, 32500, 33500, 34000, and 35200, available from The Lubrizol Corporation; dispersants such as Disperbyk-161, 162, 163, 164, 166, 180, 190, 191, and 192 available from Byk Chemie; dispersants such as Flowlen DOPA-17, DOPA-22, DOPA-33, and G-700 available from Kyoeisha Chemical Co., Ltd.; dispersants such as Ajisper PB821 and PB711 available from Ajinomoto Co., Inc.; and dispersants such as LP4010, LP4050, LP4055, POLYMER 400, POLYMER 401, POLYMER 402, POLYMER 403, POLYMER 450, POLYMER 451, and POLYMER 453 available from EFKA Chemicals. These dispersants may be used alone or in combination.

When the ink composition contains the dispersant, the content of the dispersant in the ink composition is preferably 5% to 200% and more preferably 30% to 120% by mass of the content of the colorant (particularly the pigment) in the ink composition and may be appropriately selected depending on the colorant to be dispersed.

1.2.3.2. Additives

The ink composition may contain a polymerization accelerator. Examples of the polymerization accelerator include, but are not limited to, Darocur EHA and EDB available from Ciba Specialty Chemicals Inc.

The ink composition may contain a thermoradical polymerization inhibitor. This allows the ink composition to have increased storage stability. Examples of the thermoradical polymerization inhibitor include methyl ether hydroquinone (MEHQ) available from Kanto Chemical Co., Inc. and polymerization inhibitors, such as Irgastab UV-10 and UV-22, available from Ciba Specialty Chemicals Inc.

The ink composition may further contain a surfactant. The surfactant may be anionic, cationic, amphoteric, or nonionic. Examples of the surfactant include silicone surfactants such as polyester-modified silicones and ether-modified silicones, polyether-modified dimethylsiloxanes, and polyester-modified polydimethylsiloxanes. Specific examples of the surfactant include surfactants, such as BYK-347, BYK-348, BYK-UV3500, BYK-UV3510, BYK-UV3530, and BYK-UV3570, available from Byk Chemie Japan K.K. and a surfactant, such as UV-3500, available from Ciba Specialty Chemicals Inc. When the ink composition contains the surfactant, the content of the surfactant in the ink composition is preferably 0.5% to 4.0% by mass.

The ink composition may further contain a known component usable for ordinary inks. Examples of such a component include antioxidants, humectants, infiltration solvents, pH adjustors, antiseptics, antimildew agents, and adhesion promoters.

Examples of the antioxidants include BHA (2,3-dibutyl-4-oxyanisole) and BHT (2,6-di-t-butyl-p-cresol). When the ink composition contains an antioxidant, the content of the antioxidant in the ink composition is preferably 0.01% to 3.0% by mass. The presence of an adhesion promoter in the ink composition allows the ink composition to have increased adhesion to recording media. Preferred examples of the adhesion promoter include amino acrylates, such as EBECRYL 7100 and 8402, available from DAICEL-CYTEC Co., Ltd.

The ink composition may further contain an ultraviolet absorber; a leveling agent; a matting agent; and a material, such as a polyester resin, a polyurethane resin, a vinyl resin, an acrylic resin, a rubber resin, or wax, for adjusting film properties as required. A useful example of the ultraviolet absorber is a benzophenone or benzotriazole compound. The presence of the ultraviolet absorber in the ink composition allows records to have increased light resistance. When the ink composition contains the ultraviolet absorber, the content of the ultraviolet absorber in the ink composition is preferably 0.01% to 0.5% by mass.

When the ink composition contains the above exemplified components, the ink composition is controlled on the basis of the content, molecular weight, molecular structure, and molecular interaction of each component and the zeta potential of particles of a colorant or the like, if contained, such that a, b, and c in Equation (1) are 800 or more, 7.4 to 14, and 0.16 to 0.22, respectively.

1.3. Light

When the ink composition contains the polymerizable compound and the photopolymerization initiator, examples of light applied to the ink composition include 200-400 nm ultraviolet rays, visible light, far ultraviolet rays, g-line, h-line, i-line, KrF excimer laser beams, ArF excimer laser beams, electromagnetic waves such as X-rays, and particle beams such as electron beams and alpha rays. A source of light applied thereto is not particularly limited.

In the case of applying an ultraviolet ray to the ink composition, the dose of the ultraviolet ray is preferably 10 mJ/cm$^2$ to 20,000 10 mJ/cm$^2$ and more preferably 50 mJ/cm$^2$ to 15,000 10 mJ/cm$^2$. When the dose of the ultraviolet ray is within this range, the polymerizable compound can be sufficiently cured.

Examples of a lamp used to apply the ultraviolet ray to the ink composition include metal halide lamps, xenon lamps, carbon arc lamps, chemical lamps, low-pressure mercury lamps, and high-pressure mercury lamps. In particular, the ultraviolet ray can be applied to the ink composition using, for example, a commercially available lamp such as an H lamp, D lamp, or V lamp available from Fusion System Corporation or SubZero 055 available from Integration Technology, Inc. Alternatively, the following device can be used to apply the ultraviolet ray to the ink composition: an ultraviolet light-emitting semiconductor device such as an ultraviolet light-emitting diode (UVLED) or an ultraviolet light-emitting semiconductor laser.

In the case of using, for example, an ink jet recording apparatus, the ink composition may be irradiated with light in the ink jet recording apparatus. Alternatively, after dots are formed with an ink jet recording apparatus including no irradiation system using the ink composition, the dots may be irradiated with light with an irradiation system.

1.4. Recording Method

A recording method according to an embodiment of the invention includes applying the ink composition to a recording medium by ejecting the ink composition from an ink jet recording head. In this embodiment, it is exemplified that the ink composition is ejected toward the recording medium using an ink jet recording apparatus and dots are formed by applying the ink composition to the recording medium.

1.4.1. Ink Jet Recording Head

Examples of a recording process using the ink jet recording apparatus include a process (electrostatic attraction process) in which recording is performed in such a manner that a strong electric field is applied between a nozzle and an accelerating electrode disposed in front of the nozzle, droplets of ink are continuously ejected from the nozzle, and printing information signals are applied to deflection electrodes while the ink droplets are passing between the deflection electrodes or in such a manner that the ink droplets are ejected in accordance with the printing information signals without deflecting the ink droplets, a process in which ink droplets are ejected in such a manner that an ink solution is pressurized with a micro-pump and a nozzle is mechanically vibrated with a quartz oscillator, a process (piezoelectric process) in which ink droplets are ejected for recording in such a manner that a pressure and a printing information signal are applied to an ink solution with a piezoelectric element at the same time, and a process (thermal jet process) in which ink droplets are ejected for recording in such a manner that an ink solution is heated and bubbled with a micro-electrode in accordance with an printing information signal.

The piezoelectric process can be categorized into a process using a thin film-type ink jet recording head and a process using a multilayer ink jet recording head. The thin film-type ink jet recording head includes a piezoelectric actuator, which is of a so-called unimorph type, and ejects an ink composition from a nozzle by the displacement of the piezoelectric actuator. The multilayer ink jet recording head includes a multilayer piezoelectric element and ejects an ink composition from a nozzle in such a manner that the wall of a pressure chamber communicating with the nozzle is pressed by driving the multilayer piezoelectric element in a $d_{31}$ mode. The multilayer ink jet recording head is also referred to as a longitudinal-mode ink jet recording head because the multilayer piezoelectric element presses the wall of the pressure chamber. Both the thin film-type ink jet recording head and the multilayer ink jet recording head can eject the ink composition. The multilayer ink jet recording head, that is, the longitudinal-mode ink jet recording head, can eject the ink composition with a relatively large force and therefore can quickly form a high-quality image in which print positions are hardly displaced or which is less affected by satellites and the like. The thin film-type ink jet recording head can be operated at a relatively high speed and therefore can quickly form a high-definition, high-quality image in which print positions are hardly displaced or which is further less affected by satellites and the like.

In the recording method, the driving frequency F of an ink jet recording head used in each of the electrostatic attraction process, the piezoelectric process, and the thermal jet process is preferably 1 kHz to 200 kHz. The driving frequency F of the ink jet recording head corresponds to the frequency of the voltage applied to the ink jet recording head. The voltage applied thereto has a simple sinusoidal waveform or a waveform consisting of a plurality of superimposed waves in some cases. Therefore, the driving frequency F is herein defined as the reciprocal of the shortest time taken to eject two droplets of the ink composition from one nozzle. In other words, the driving frequency F corresponds to the number of droplets ejectable from one nozzle per second. When the driving frequency F is 1 kHz to 200 kHz, a high-quality image in which print positions are hardly displaced or which is less affected by satellites and the like can be quickly formed on a recording medium.

In the recording method, the ink jet recording head used in each of the electrostatic attraction process, the piezoelectric process, and the thermal jet process preferably includes a nozzle with a diameter of 1 μm to 50 μm. This allows a high-definition image on a recording medium. In the ink jet recording head used in each of the electrostatic attraction process, the piezoelectric process, and the thermal jet process, droplets of the ink composition preferably each have a volume of 0.1 pl to 20 pl. This allows a high-definition image on a recording medium.

The ink jet recording apparatus used in this embodiment can be exemplified as one including the ink jet recording head, a body, a tray, a head drive, a carriage, and the like. The ink jet recording head may include cartridges containing at least four differently colored inks such as a cyan ink, a magenta ink, a yellow ink, and a black ink so as to be capable of performing full-color printing. In this embodiment, at least one of the cartridges is filled with the ink composition. The other cartridges may be filled with ordinary inks. The ink jet recording apparatus includes a dedicated control board and the like and therefore can control the timing of ink ejection of the ink jet recording head and control the scanning of the head drive.

The ink jet recording apparatus preferably includes a unit capable of light irradiation for the purpose of curing the ink composition, which contains the polymerizable compound and the photopolymerization initiator. Such a unit can be exemplified as, for example, an ultraviolet irradiation device, which is mounted on a side surface of the carriage in the ink jet recording apparatus.

1.4.2. Recording Medium

A recording medium used in this embodiment is not particularly limited and can be coated with droplets of the ink composition with the ink jet recording apparatus. Examples of the recording medium include absorptive recording media such as paper, porous sheets, and cloth and non-absorptive recording media such as metal, glass, and plastic. The choice of the absorptive or non-absorptive recording media depends on components contained in the ink composition. The recording medium may be a colorless transparent medium, a translucent medium, a colored transparent medium, a colored opaque medium, a colorless opaque medium, or the like.

The recording medium may be glossy, matte, or dull. Examples of the recording medium include treated paper sheets such as coated paper sheets, art paper sheets, and cast-coated paper sheets and plastic films such as polyvinyl chloride sheets and PET films. Commercially available examples of the recording medium include pearl-coated paper sheets available from Mitsubishi Paper Mills Ltd., Aurora Coat paper (coated printing paper) sheets available from Nippon Paper Industries Co., Ltd., glossy polyvinyl chloride sheets available under a trade name of SP-SG-1270C from Roland DG Corporation, and PET films available under a trade name of XEROX FILM (frameless) from Fuji Xerox Co., Ltd.

2. Examples and Comparative Examples

The invention is further described below in detail with reference to examples and comparative examples, which do not limit the scope of the invention.

2.1. Ink Compositions

Ink compositions were prepared in Examples 1 to 8 and Comparative Examples 1 to 6. The composition and components of each ink composition were summarized in Table 1.

TABLE 1

| Components (parts by mass) | | Examples | | | | | | | | Comparative Examples | | | | | |
|---|---|---|---|---|---|---|---|---|---|---|---|---|---|---|---|
| | | 1 | 2 | 3 | 4 | 5 | 6 | 7 | 8 | 1 | 2 | 3 | 4 | 5 | 6 |
| Monofunctional polymerizable compounds | V#192 | 15 | 15 | 30 | 15 | 30 | 15 | 15 | 15 | 37 | 37 | 30 | 37 | 37 | 30 |
| | FA-512AS | — | — | — | — | 2 | — | 2 | 2 | 20 | 18 | 20 | 15 | 15 | 25 |
| | FA-511AS | — | — | — | — | 2 | — | 2 | 2 | 10 | 8 | 10 | 5 | 5 | 15 |
| | Vinyl caprolactam | 15 | 15 | 10 | 15 | 10 | 15 | 15 | 15 | — | — | 10 | — | 2 | 10 |
| Bifunctional polymerizable compounds | DPGDA | 25 | 20 | 15 | 20 | 15 | 20 | 23 | 23 | — | 2 | — | 5 | 5 | 5 |
| | TPGDA | 25 | 25 | 15 | 25 | 15 | 25 | 23 | 23 | — | 2 | — | 5 | 5 | 5 |
| | TEGDA | — | — | — | — | — | — | — | 2 | 8 | 8 | — | 8 | 8 | — |
| | A-DCP | — | — | 9 | — | 9 | — | — | — | — | — | 9 | — | — | 9 |
| Adhesion promoters | EBECRYL7100 | — | 10 | 4 | 6 | 2 | — | — | — | 4 | 4 | 4 | 4 | 4 | 4 |
| | EBECRYL8402 | 0.5 | — | — | — | — | 3.5 | 0.5 | 0.5 | 0.9 | 0.9 | — | 0.9 | 0.9 | — |
| Thermo-polymerization inhibitor | MEHQ | 0.1 | 0.2 | 0.1 | 0.2 | 0.1 | 0.2 | 0.1 | 0.1 | 0.1 | 0.1 | 0.1 | 0.1 | 0.1 | 0.1 |
| Surfactant | UV3500 | 0.1 | 0.1 | 0.1 | 0.1 | 0.1 | 0.1 | 0.1 | 0.1 | 0.1 | 0.1 | 0.1 | 0.1 | 0.1 | 0.1 |
| Photo-polymerization initiators | IRGACURE 819 | 4.5 | 4.5 | 4.5 | 4.5 | 4.5 | 4.5 | 4.5 | 4.5 | 4.5 | 4.5 | 4.5 | 4.5 | 4.5 | 4.5 |
| | DAROCURE TPO | 4.5 | 4.5 | 4.5 | 4.5 | 4.5 | 4.5 | 4.5 | 4.5 | 4.5 | 4.5 | 4.5 | 4.5 | 4.5 | 4.5 |
| | DETX | 1 | 1 | 1 | 1 | 1 | 1 | 1 | 1 | 1 | 1 | 1 | 1 | 1 | 1 |
| Pigment dispersion | PEA + pigCyan 15% | 10 | 10 | 10 | 10 | 10 | 10 | 10 | 10 | 10 | 10 | 10 | 10 | 10 | 10 |
| Total | | 100.7 | 105.3 | 103.2 | 101.3 | 105.2 | 98.8 | 100.7 | 102.7 | 100.1 | 100.1 | 103.2 | 100.1 | 102.1 | 123.2 |
| Viscosity at 20° C. [mPa · s] | | 25.1 | 34.5 | 32.2 | 28.9 | 30.5 | 34.8 | 25.2 | 25.6 | 32.9 | 29.4 | 33.7 | 24.8 | 25.2 | 34.9 |
| Viscosity at 40° C. [mPa · s] | | 10.1 | 13.9 | 12.8 | 11.6 | 12.5 | 14.1 | 10.2 | 10.3 | 13.1 | 11.8 | 13.6 | 10.2 | 10.2 | 14.3 |

Details of components shown in Table 1 were as described below.

Monofunctional Polymerizable Compounds
    V#192: phenoxyethyl acrylate available from Osaka Organic Chemical Industry Ltd.
    FA-512AS: dicyclopentenyloxyethyl acrylate available from Hitachi Chemical Co., Ltd.
    FA-511AS: dicyclopentenyl acrylate available from Hitachi Chemical Co., Ltd.
    Vinylcaprolactam available from BASF Japan Ltd. Bifunctional polymerizable compounds
    DPGDA: dipropyleneglycol diacrylate available from Shin-Nakamura Chemical Co., Ltd.
    TPGDA: tripropyleneglycol diacrylate available from Osaka Organic Chemical Industry Ltd.
    TEGDA: triethyleneglycol diacrylate available from Osaka Organic Chemical Industry Ltd.
    A-DCP: dimethyloltricyclodecane diacrylate available from Sartomer Company.

Adhesion Promoters
    EBECRYL 7100: an amino acrylate available from DAICEL-CYTEC Co., Ltd.
    EBECRYL 8402: an amino acrylate available from DAICEL-CYTEC Co., Ltd.

Thermal Polymerization Initiator
   MEHQ: methyl ether hydroquinone available from Kanto Chemical Co., Inc.
Surfactants
   UV3500: a polydimethylsiloxane surfactant available from Byk Chemie Japan K.K.
   Irgacure 819: a photopolymerization initiator available from Ciba Specialty Chemicals Inc.
   Dacocure TPO: a photopolymerization initiator available from Ciba Specialty Chemicals Inc.
   DETX: diethylthioxanthone available from Nippon Kayaku Co., Ltd.
Colorant and Dispersant
   C.I. Pigment Blue 15:4: a cyan pigment available from DIC Corporation.
   PEA: a polyoxyalkylene-added polyalkyleneamine available from Dai-ichi Kogyo Seiyaku Co., Ltd.

A colorant, a dispersant, PEA, and a cyan pigment were blended into a pigment dispersion. The content of the cyan pigment in the pigment dispersion was 15% by mass.

An ink composition was prepared in each example or comparative example in such a manner that components shown in Table 1 were blended at a ratio shown in Table 1 and were dissolve by mixing the components at 30 minutes at room temperature and the mixture was filtered through a 5-µm membrane filter. In Table 1, the content of each component in the ink composition is expressed in parts by mass.

All the obtained ink compositions were measured for viscosity at 20° C. and 40° C. with a viscometer, MCR-300, available from Nihon SiberHegner K.K. The viscosities thereof were summarized in Table 1.

2.2. Evaluation Tests
2.2.1 Extensional Viscometer

A cylindrical portion was formed by expanding each ink composition so as to have a free surface parallel to the expanding direction of the ink composition. The rate of change S in width of the cylindrical portion with time was measured in the expanding direction thereof. In the examples and the comparative examples, an extensional viscometer, CaBER 1, available from Thermo Haake Inc. was used.

2.2.2. Fitting

Figure 1B:
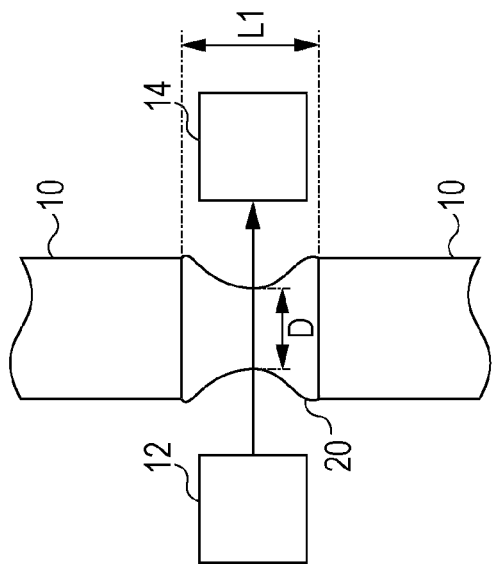
Figure 1A:
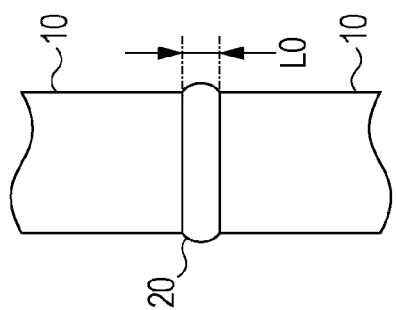

A technique for determining a, b, and c in Equation (1) by expanding each ink composition with the extensional viscometer is described below. FIGS. 1A to 1C are illustrations showing the ink composition being expanded.

With reference to FIGS. 1A to 1C, the extensional viscometer includes a pair of cylindrical jigs 10 arranged opposite each other, a laser light source 12, and a detector 14 facing the laser light source 12, the laser light source 12 and the detector 14 being arranged perpendicularly to the direction in which the jigs 10 are arranged. The jigs 10 have a diameter of, for example, 1 mm to 10 mm. In the examples and the comparative examples, the diameter of each jig 10 was 6 mm.

The jigs 10 are spaced from each other at a distance L0 as shown in FIG. 1A. In the examples and the comparative examples, the distance L0 between the jigs 10 was 1 mm. A composition 20 is placed between the jigs 10. The distance between the jigs 10 is increased to a specific level as shown in FIG. 1B. The moving rate of the jigs 10 is, for example, 0.01 m/s to 1 m/s. In the examples and the comparative examples, the moving rate of the jigs 10 was 0.05 m/s and the distance L1 between the moved jigs 10 was 4 mm. That is, in the examples and the comparative examples, the time taken for the distance L0 to increase to the distance L1 was 60 ms.

The width D of the composition 20 is measured with the laser light source 12 and the detector 14 while the jigs 10 are being moved away from each other. The width D thereof can be plotted with respect to time with an analysis software program attached to the extensional viscometer. The rate of change S in width can be also plotted with respect to time with the attached analysis software program on the basis of the width D at a specific point in time.

In the examples and the comparative examples, the rate of change S in width was plotted with respect to the width D of the composition 20 placed between the unmoved jigs 10 and was fit to a quadratic function with the attached analysis software program or another computer by the method of least squares. Obtained results were substituted into Equation (1), whereby the values of a, b, and c were determined. In the examples and the comparative examples, fitting was performed in such a manner that the origin of the time t was set to the point in time when the width D was reduced to about 20% to 25% (that is, about 1.5 mm) of a value before the distance between the jigs 10 was increased. Since the origin of the time t was set as described above, the ink composition in the cylindrical portion was in an expansion fluid state, resulting in an increase in accuracy of fitting.

Figure 2:
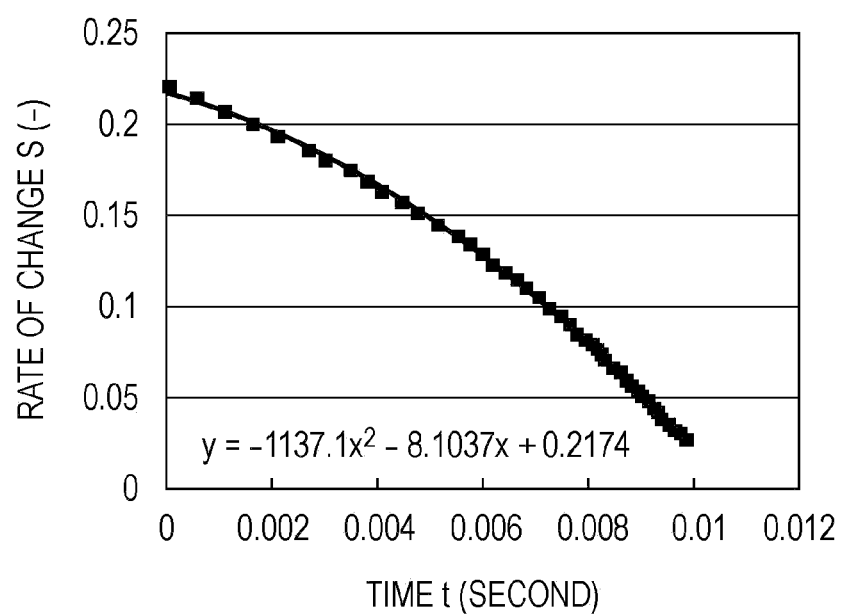
FIG. 2 is a graph showing results obtained by fitting.

FIG. 2 is a graph showing results obtained by fitting the ink composition prepared in Example 1. The abscissa and ordinate of this graph represent the time t (s) and the rate of change S in width D, respectively.

2.2.3 Properties of Ink Compositions

Table 2 shows the values of a, b, and c of the ink composition prepared in each of the examples and the comparative examples. The extensional viscometer can be used to measure the time ts (s) taken until the composition 20 is broken. Table 2 also shows the time ts of the ink composition prepared in each of the examples and the comparative examples.

TABLE 2

|  |  | Fitting results | a | b | c | ts (s) | Evaluation results of satellites |
|---|---|---|---|---|---|---|---|
| Examples | 1 | $S = -1137.1t^2 - 8.1037t + 0.2174$ | 1137 | 8.1 | 0.22 | 0.0107 | Good |
|  | 2 | $S = -1159.8t^2 - 8.156t + 0.211$ | 1160 | 8.2 | 0.21 | 0.0104 | Good |
|  | 3 | $S = -873.27t^2 - 8.7206t + 0.1941$ | 873 | 8.7 | 0.19 | 0.0107 | Good |
|  | 4 | $S = -826.19t^2 - 7.42t + 0.2134$ | 826 | 7.4 | 0.21 | 0.0122 | Good |
|  | 5 | $S = -897.21t^2 - 12.91642t + 0.1664$ | 897 | 12.9 | 0.17 | 0.0082 | Good |
|  | 6 | $S = -800.9t^2 - 13.562t + 0.1672$ | 801 | 13.6 | 0.17 | 0.0083 | Good |
|  | 7 | $S = -822.97t^2 - 9.1393t + 0.1947$ | 823 | 9.1 | 0.19 | 0.0288 | Good |
|  | 8 | $S = -1076.3t^2 - 8.6105t + 0.218$ | 1076 | 8.6 | 0.22 | 0.0108 | Good |
| Comparative Examples | 1 | $S = -490.46t^2 - 8.4598t + 0.2286$ | 490 | 8.5 | 0.23 | 0.0146 | Bad |
|  | 2 | $S = -463.53t^2 - 8.94421t + 0.2235$ | 464 | 8.9 | 0.22 | 0.0143 | Bad |
|  | 3 | $S = -547.56t^2 - 8.4708t + 0.2155$ | 548 | 8.5 | 0.22 | 0.0136 | Bad |
|  | 4 | $S = -644.14t^2 - 8.5984t + 0.2142$ | 644 | 8.6 | 0.21 | 0.0127 | Bad |
|  | 5 | $S = -571.7t^2 - 8.2384t + 0.2152$ | 572 | 8.2 | 0.22 | 0.0135 | Bad |
|  | 6 | $S = -472.66t^2 - 8.619t + 0.2234$ | 473 | 8.6 | 0.22 | 0.0145 | Bad |

As shown in Table 2, for the ink compositions of all the examples, a is 800 or more, b is 7.4 to 14, and c is 0.16 to 0.22. For the ink compositions of all the comparative examples, a is less than 800. For the ink compositions of Comparative Examples 1, 2, and 6, c is greater than 0.22. For the ink compositions of all the examples and the comparative examples, the time ts (s) taken until the composition 20 is broken is 0.1 s or less. For the ink compositions of Examples 5 and 6, the time ts is 0.01 s or less.

2.3. Print Evaluation

The ink composition of each of the examples and the comparative examples was introduced into a black column of an ink jet printer, PX-G5100, available from Seiko Epson Corporation. The ink composition was ejected from the ink jet printer, whereby a test pattern was printed on a recording medium, having an A4 size, prepared by cutting a polyvinyl chloride sheet, SPVC-G-1270T, available from Roland DG Corporation.

The test pattern was observed with an optical microscope and was evaluated for the presence of satellites. A test pattern having no satellite was rated as A. A test pattern having a satellite was rated as B. Table 2 shows the evaluation results. Those having satellites are probably due to mist generated during ejection.

As is clear from Table 2, the ink compositions of the examples all show no satellite because a, b, and c in Equation (1) are 800 or more, 7.4 to 14, and 0.16 to 0.22, respectively. In contrast, the ink compositions of the comparative examples all show satellites because a in Equation (1) is less than 800.

The ink compositions of the examples are prepared so as to have a viscosity of 25 mPa·s to 35 mPa·s at 20° C. The cylindrical portion is formed by expanding each ink composition so as to have a free surface parallel to the expanding direction of the ink composition and the rate of change S in width of the cylindrical portion with time is measured in the expanding direction thereof. The ink composition is controlled such that a, b, and c are 800 or more, 7.4 to 14, and 0.16 to 0.22, respectively, when the rate of change S in width of the cylindrical portion with time t (s) is fit to a quadratic function given by Equation (1). Therefore, the rate at which the width of the cylindrical portion formed by expanding each of the ink compositions of the examples is reduced is sufficiently large and the ink compositions of the examples can be stably ejected from ink-ejecting heads of ink jet recording apparatuses and can provide high-quality images in which print positions are hardly displaced or which are less affected by satellites.

The invention is not limited to the above embodiments. Various modifications can be made within the scope of the invention. The invention includes configurations (for example, configurations having functions, methods, and results identical to those described in the embodiments and configurations having objects and effects identical to those described in the embodiments) substantially identical to those described in the embodiments. The invention also includes configurations in which portions not essential for the configurations described in the embodiments are replaced with others. The invention includes configurations that exhibit advantageous effects identical to those described in the embodiments or that can achieve objects identical to those described in the embodiments. Furthermore, the invention includes configurations in which known techniques are added to the configurations described in the embodiments.

What is claimed is:

1. A recording method comprising:
ejecting an ink composition from an ink jet recording head such that the ink composition is applied to a recording medium, the ink composition having:
a viscosity of 25 mPa·s to 35 mPa·s at 20° C.,
wherein a, b, and c are 800 or more, 7.4 to 14, and 0.16 to 0.22, respectively, when a cylindrical portion is formed by expanding the ink composition so as to have a free surface parallel to the expanding direction of the ink composition, the rate of change in width of the cylindrical portion with time is measured in the expanding direction thereof, and the rate of change in width of the cylindrical portion with time is fit to a quadratic function given by the following equation:

$$S = -at^2 - bt + c \quad (1)$$

where S is the rate of change in width of the cylindrical portion and t is the time in seconds,
wherein:
the ink composition contains a vinylcaprolactam and at least one of a monofunctional (meth)acrylate and at least one of a bifunctional (meth)acrylate;
the driving frequency F of the ink jet recording head is 1 kHz to 200 kHz;
the ink jet recording head includes a nozzle for ejecting the ink composition, the nozzle having a diameter of 1 μm to 50 μm; and
droplets of the ink composition applied to the recording medium each have a volume of 0.1 pl to 20 pl.

2. The recording method according to claim 1, wherein the rate of change S is based on the width of the cylindrical portion at the beginning of expansion.

3. The recording method according to claim 1, wherein the time taken to reduce the width of the cylindrical portion to zero is within 0.1 second from the beginning of expansion.

4. The recording method according to claim 1, wherein the ink composition comprises at least one polymerizable compound and at least one photopolymerization initiator.

5. The recording method according to claim 1, wherein the ink jet recording head includes a multilayer piezoelectric element and is operated in a longitudinal mode.

6. The recording method according to claim 1, wherein the monofunctional (meth)acrylate contains at least one of phenoxyethyl acrylate, dicyclopentenyloxyethyl acrylate, or dicyclopentenyl acrylate.

7. The recording method according to claim 1, wherein the bifunctional (meth)acrylate contains at least one of dipropyleneglycol diacrylate, tripropyleneglycol diacrylate, triethyleneglycol diacrylate, or dimethyloltricyclodecane diacrylate.

8. The recording method according to claim 1, wherein the ratio of the amount of monofunctional (meth)acrylate to the amount of bifunctional (meth)acrylate is between 0.6 and 1.1.

9. A recording method comprising:
ejecting an ink composition from an ink jet recording head such that the ink composition is applied to a recording medium, the ink composition comprising at least one monofunctional (meth)acrylate and at least one of a bifunctional (meth)acrylate, wherein
the ink composition has a viscosity of 25 mPa·s to 35 mPa·s at 20° C., and
a rate of change in the width of a cylindrical portion with time (S) that is formed by expanding the ink composition and the width is measured in the expanding direction thereof, so as to have a free surface parallel to the expanding direction of the ink composition defined by the quadratic equation:

$$S = -at^2 - bt + c \qquad (1)$$

wherein a, b, and c are 800 or more, 7.4 to 14, and 0.16 to 0.22, respectively, and t is the time in seconds;

wherein:
- a driving frequency F of the ink jet recording head is 1 kHz to 200 kHz;
- the ink jet recording head includes a nozzle for ejecting the ink composition, the nozzle having a diameter of 1 μm to 50 μm; and
- droplets of the ink composition applied to the recording medium each have a volume of 0.1 pl to 20 pl.

10. The recording method according to claim 1, wherein the ink composition contains an amino acrylate.

* * * * *